(12) United States Patent
Bär et al.

(10) Patent No.: US 11,370,118 B2
(45) Date of Patent: Jun. 28, 2022

(54) METHOD FOR ADJUSTING A PROTECTIVE FUNCTION DURING OPERATION OF A MACHINE BY GENERATING AN UNMONITORED WINDOW REGION HAVING PROTECTIVE DEVICES, AND PROTECTIVE APPARATUS

(71) Applicant: Siemens Aktiengesellschaft, Munich (DE)

(72) Inventors: Felix Bär, Fürth (DE); Rene Graf, Zirndorf (DE); Ralf Gross, Nuremberg (DE); Matthias Loskyll, Neumarkt (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/414,105

(22) PCT Filed: Dec. 17, 2018

(86) PCT No.: PCT/EP2018/085273
§ 371 (c)(1),
(2) Date: Jun. 15, 2021

(87) PCT Pub. No.: WO2020/125930
PCT Pub. Date: Jun. 25, 2020

(65) Prior Publication Data
US 2022/0072710 A1 Mar. 10, 2022

(51) Int. Cl.
*B25J 9/16* (2006.01)
*B25J 19/00* (2006.01)

(52) U.S. Cl.
CPC ............. *B25J 9/1676* (2013.01); *B25J 9/163* (2013.01); *B25J 9/1664* (2013.01); *B25J 19/0075* (2013.01)

(58) Field of Classification Search
CPC ........ B25J 9/1676; B25J 9/163; B25J 9/1664; B25J 19/0075
See application file for complete search history.

(56) References Cited

U.S. PATENT DOCUMENTS

2003/0210807 A1 11/2003 Sato et al.
2007/0131850 A1 6/2007 Cofer et al.
(Continued)

FOREIGN PATENT DOCUMENTS

CN 1457023 A 11/2003
CN 101310194 A 11/2008
(Continued)

OTHER PUBLICATIONS

Chinese Notice of Allowance for Chinese Application No. 201880100267.4 dated Sep. 24, 2021.
(Continued)

*Primary Examiner* — Basil T. Jos
(74) *Attorney, Agent, or Firm* — Lempia Summerfield Katz LLC

(57) ABSTRACT

The invention relates to a method for adjusting a protective function during operation of a machine (1), in which a transfer region (5) is monitored by a plurality of protective devices (L1, L2), the transfer region (5) being arranged between a risk region (2), in which a dangerous movement is performed by the machine (1), and a surrounding region (3), the transfer region (5) being monitored by first protective devices (L1) in respective first monitoring directions (UI) and, independently thereof, by second protective devices (L2) in respective second monitoring directions (U2), at least one of the first protective devices (L1) and at least one of the second protective devices (L2) being arranged relative to one another in such a way that the first monitoring direction (UI) of the at least one first protective device (L1) and the second monitoring device (U2) of the at
(Continued)

least one second protective device (L2) have a point of intersection (S).

13 Claims, 4 Drawing Sheets

(56) References Cited

U.S. PATENT DOCUMENTS

| | | |
|---|---|---|
| 2008/0273758 A1 | 11/2008 | Fuchs et al. |
| 2009/0268029 A1 | 10/2009 | Haussmann et al. |
| 2009/0289791 A1 | 11/2009 | Onishi |
| 2009/0295580 A1 | 12/2009 | Inoue et al. |
| 2015/0269427 A1 | 9/2015 | Kim et al. |

FOREIGN PATENT DOCUMENTS

| | | | | |
|---|---|---|---|---|
| CN | 101587194 A | 11/2009 | | |
| CN | 101599205 A | 12/2009 | | |
| CN | 104935879 A | 9/2015 | | |
| DE | 60309362 T2 | * 8/2007 | ................ | F16P 3/14 |
| DE | 60309362 T2 | 8/2007 | | |

OTHER PUBLICATIONS

International Preliminary Report on Patentability for International Patent Application PCT/EP2018/085273 dated Feb. 11, 2021, with English translation.
International Search Report and the Written Opinion for International Patent Application PCT/EP2018/085273 dated Sep. 24, 2019.

* cited by examiner

METHOD FOR ADJUSTING A PROTECTIVE FUNCTION DURING OPERATION OF A MACHINE BY GENERATING AN UNMONITORED WINDOW REGION HAVING PROTECTIVE DEVICES, AND PROTECTIVE APPARATUS

RELATED CASE

The present patent document is a § 371 nationalization of PCT Application Serial Number PCT/EP2018/085273, filed Dec. 17, 2018, which is hereby incorporated by reference.

FIELD

The present embodiment relates to a method for adjusting a protective function during operation of a machine in which a transition region is monitored by a plurality of non-separating protective devices. The transition region is arranged between a danger area in which a dangerous movement is performed with the machine and a surrounding area. The present embodiments further relate to a protective device for adjusting a protective function during operation of a machine.

BACKGROUND

On the basis of a risk assessment, the danger area is determined for a machine as the area in the machine and/or its surroundings in which the safety or health of a person is at risk. In the case of risks due to moving parts, the moving parts must be equipped with separating or non-separating protective devices. A separating protective device is a machine part which offers protection by a physical barrier, for example a grating, a door or the like. Non-separating protective devices are devices without a separating function that reduce the risk alone or in conjunction with a separating protective device. Non-separating protective devices of this type can be provided, for example, by an optical system. In relation to controls, non-separating protective devices must retain unrestricted functionality or must trigger a shutdown command.

A monitored transition region is defined by non-separating protective devices, for example by optical systems, in order to provide the protective function. In the event of violation of the transition region by a penetrating object, the dangerous movement of the safety-critical machine is deactivated. A penetration into the transition region correspondingly results in a work interruption of the safety-critical machine, regardless of whether a dangerous situation would actually arise. This results in a productivity reduction in the collaboration of machines, which are separated from one another by non-separating protective devices. This also applies, in particular, if one of the machines is not safety-critical. Furthermore, in the event of penetration into the transition region, no distinction is made between persons and machines, so that a coordination of the penetration cannot be enabled by a targeted release.

Through common, physical or non-physical, enclosure of the collaborating machines, the work interruptions that have resulted from a penetration into the previously existing transition region can be prevented. However, a productivity reduction also results from the enlarged protective region. Furthermore, a facility for collaboration with persons is still not provided, even if the machine that was previously located in the surrounding area is capable of human-machine collaboration and therefore requires no monitoring by an additional protective device.

Specialized, physically defined interfaces can be used for special tasks, such as the material supply of machines. These interfaces are special solutions developed for the specific application. Functionality modifications therefore also require a mechanical adjustment.

A further facility for circumventing the work interruption is the use of an airlock. In this scenario, the airlock replaces the non-separating protective device. It is opened in each case on one side only in order to further maintain the protective function. Only one of the collaborating machines can therefore ever operate in the airlock region. This results in a reduced performance, increased space requirement and possibly the need for an additional mechanical system for the material handling.

SUMMARY AND DETAILED DESCRIPTION

The object is to indicate a solution whereby, in providing a protective function during operation of a safety-critical machine, the operation of the machine can be carried out more efficiently, particularly in terms of a collaboration with a non-safety-critical machine.

This object is achieved by a method and by a protective device with the features as claimed in the independent claims. Advantageous developments are indicated in the dependent claims.

A method according to one embodiment serves to adjust a protective function during operation of a machine. The machine is, in particular, a safety-critical machine. In the method, a transition region is monitored by a plurality of non-separating protective devices, wherein the transition region is arranged between a danger area in which a dangerous movement is carried out with the machine and a surrounding area. The transition region is monitored with first non-separating protective devices along respective first monitoring directions and, independently therefrom, with second non-separating protective devices along respective second monitoring directions. At least one of the first non-separating protective devices and at least one of the second non-separating protective devices are arranged relative to one another in such a way that the first monitoring direction of the at least one first non-separating protective device and the second monitoring direction of the at least one second non-separating protective device have a point of intersection.

By the method, a protective function is intended to be provided during the operation of the machine. The machine is a safety-critical machine. During operation, the machine can move or the machine can have parts that move. In the danger area, this movement poses a risk to the safety and/or health of persons. The protective function is provided in order to prevent this risk. The non-separating protective devices are used for this purpose. The transition region is monitored by these non-separating protective devices. This transition region separates the danger area from the surrounding area in which no risk is posed by the machine. If an object, for example a person, is detected in the transition region by the non-separating protective devices, the dangerous movement of the machine is stopped. It is now provided according to one embodiment that first non-separating protective devices and second non-separating protective devices are used as the plurality of non-separating protective devices. The transition region or at least a relevant part thereof is monitored with the respective non-separating protective devices. The non-separating protective devices monitor the transition region independently from one another and redundantly. In other words, independently operating non-separating protective devices can therefore be used. The transition region can be monitored from different directions with non-separating protective devices.

The respective first non-separating protective devices can be designed, for example, as an optical system or as optical sensors. The first non-separating protective devices can be designed in the form of a light barrier or can form a light curtain. Monitoring can generally be carried out with each of the first non-separating protective devices along the first monitoring direction. A radiation along the first monitoring direction can be emitted, for example, in each case with the first non-separating protective devices. Due to an influencing of this radiation by an object, the presence of the object can be detected by the first non-separating protective device. The first monitoring directions can in each case run parallel to one another. It can also be provided that the first monitoring directions are different from one another. The second non-separating protective devices are designed, in particular, as identical in construction to the first non-separating protective devices. Here, the first non-separating devices and the second non-separating devices can be designed and/or arranged relative to one another in such a way that the respective vectors of the monitoring directions are not all co-linear in pairs. At least one of the first non-separating protective devices and at least one of the second non-separating protective devices are designed or arranged relative to one another in such a way that the first monitoring direction of the at least one first non-separating protective device and the second monitoring direction of the at least one second non-separating protective device have a point of intersection. The combination of the non-separating protective devices and the simultaneous monitoring of the transition region enables virtually any geometric form to be monitored without a critical gap formation. The protective function can be adjusted in this way. The transition region can further be chosen more flexibly and the space requirement can therefore be reduced. Overall, the monitored operation of the machine can be carried out more efficiently.

In one embodiment, the at least one first non-separating protective device and the at least one second non-separating protective device are deactivated in order to generate an unmonitored window region assigned to the point of intersection. If one of the non-separating protective devices is deactivated, this generates an unmonitored region in relation to this non-separating protective device in which no object can be detected. The unmonitored region can continue to be monitored by a further of the non-separating protective devices in the respective other monitoring direction. The unmonitored window region can be generated if the at least one first non-separating protective device and the at least one non-separating protective device in which the first monitoring direction and the second monitoring direction have the point of intersection are deactivated. This window region, which can also be referred to as a window, is assigned to the point of intersection and is generated from the superimposition of the unmonitored regions of the protective devices. The dimensions of the window region are dependent on the arrangement and design of the non-separating protective devices. As long as non-separating protective devices remain active, the facility is provided for any deactivation of the redundant non-separating protective devices without the overall monitoring of the monitoring region being restricted. In this unmonitored window region, for example, the machine is able to penetrate or pass through the monitoring region enabled for the machine. As a result, for example, a further, non-safety-critical machine or a part thereof can move into the window region without one of the non-separating protective devices being triggered and therefore without the movement of the safety-critical machine being stopped. Maintenance work can further be enabled inside the danger area without a work interruption of the safety-critical machine. This results in an increase in productivity by reducing the work interruptions of the machine. A coordinated deactivation of the protective function in specific regions of an already existing system can further be enabled in order to provide the protective function.

In a further embodiment, a plurality of the first non-separating protective devices and a plurality of the second non-separating protective devices are arranged relative to one another in such a way that the first monitoring directions of the first non-separating protective devices and the second monitoring directions of the second non-separating protective devices have respective points of intersection. A plurality of first non-separating protective devices and a plurality of second non-separating protective devices can therefore preferably be provided in which the monitoring directions have points of intersection. It is provided here, in particular, that a position and/or dimensions of an unmonitored window region assigned to the points of intersection is/are adjusted through a targeted deactivation and/or activation of the respective first non-separating protective devices and the respective second non-separating protective devices. Through a partial deactivation of the non-separating protective devices combined with the different monitoring directions, it is possible to generate the new unmonitored window of any size in the transition region. A plurality of window regions can further be generated simultaneously in the transition region. The possibilities in terms of the shapes and the size of the window region depend on the non-separating protective devices that are used and their arrangement.

A movement of a further, non-safety-critical machine is preferably determined and/or the dimensions of the unmonitored window region is/are adjusted continuously depending on the movement. In other words, position information describing the current position of the further machine or the part of the further machine is determined. The position and/or the dimensions of the unmonitored window region can then be determined depending on the position information. The position information relates to the part of the further, non-safety-critical machine which is located in the transition region. Without restricting the general principles, it is assumed below that the position information relates to the coordinate system of the transition region and includes the size of the machine part located in the transition region, similarly in relation to the coordinate system of the transition region. If not, the described information can be transformed into the relevant reference system. The position and the size of the window region can be calculated on the basis of this information so that operation of the further machine in or through the transition region is enabled without activating one of the non-separating protective devices that are used.

The position and/or the dimensions of the unmonitored window region are preferably determined in such a way that an operation or movement of the further machine through the transition region is enabled. The operation of the further machine through the transition region is thus enabled through coordination of the window region with the movement of the further machine. The simultaneous operation of the safety-critical machine and the further, non-safety-critical machine can be improved in this way. This enables, for example, the operation of modular systems, including collaborative robots. An improved collaboration efficiency and new possibilities for collaboration are further created by access facilities without work interruption and more dynamic interfaces to the safety-critical machine through the adjustment of the unmonitored regions according to the corresponding requirements. With a suitable arrangement of the non-separating protective devices, the window can be designed in terms of its shape and size in such a way that the necessary level of protection, for example a finger protection or hand protection, is further provided.

The described coordination of the window or window region with the machine movements therefore results in an implicit distinction between persons and machines. The operation of the further machine through the transition region without a work interruption of the safety-critical machine is thus enabled. An increase in the risk of endangering the safety or health of persons can be avoided through suitable selection of the arrangement, number and type of the non-separating protective device.

In a further embodiment, in order to determine the movement of the further machine, a trajectory is calculated and/or movement data which describe the movement of the further machine are provided by the further machine. The movement data that describe the movement of the further machine or of the part of the further machine can be provided by the further machine. These movement data can serve as a basis for calculating or simulating the trajectory. A corresponding simulation program, for example a robot simulation program, can be used for this purpose. The common movement of the further machine and of the window can be predefined for defined operations by incorporating the non-separating protective devices into the simulation or calculation of the trajectories of the machine movements. This results in window trajectories which match the corresponding machine trajectories and contain time-dependent positions and sizes of the window. Through synchronous running of the machine trajectory with the window trajectory, the operation of the further machine through the transition region can be enabled. In the event of deviations between the machine position and the simulated or calculated trajectory, the further machine leaves the currently released window and the non-separating protective devices trigger their protective function. An adjustment of the sequence to differing speeds in the real process is possible with corresponding additional information relating to the real speed. In addition, a scaling factor can be inserted into the simulation or calculation of the windows according to the required level of protection in order to compensate for minor deviations of the real machine trajectory.

In a further embodiment, in order to determine the movement of the further machine, the movement of the further machine is observed during an initial learning phase by the first non-separating protective device and/or the second non-separating protective device. The required window trajectories can be learnt in the initial learning phase through suitable observation by the non-separating protective devices or other apparatuses which can monitor the defined transition region in a suitable manner. The learnt window trajectories can be labelled by suitable metadata and can be retrieved in the subsequent, real process sequence. The existing functionality of non-separating protective devices can be extended accordingly for this purpose or a monitoring system designed specifically for this method may appear as a product on the market.

In addition, it can be provided that the freedom of movement of the window region is restricted by external signals. Limits can therefore be specified for adjusting the position and/or the dimensions of the window region. This option can be used, in particular, to avoid collisions of the further machine with the safety-critical machine.

Furthermore, through a suitable positioning of the non-separating protective devices, it is possible for one (or more, but not all) of the non-separating protective devices first to be activated in the event of penetration into the transition region. Which non-separating protective device is initially activated is possibly dependent on the relative position and angle of the object penetrating the transition region. If the activation is used as an initial trigger to release the window, the direction from which the penetration into the transition region takes place can thus be determined. A training of persons in respect of the regularity in the trajectories can be prevented by inserting random shifts of the window region into the movement sequence coordinated between the further machine and non-separating protective devices.

In a further embodiment, the movement of the machine is interrupted if a part of the machine or a different object is detected in the transition region by one of the first non-separating protective devices and/or one of the second non-separating protective devices. The safety-critical machine must not operate in or move into the transition region. If the safety-critical machine moves into the transition region, this can be detected with the non-separating protective devices and the movement of the safety-critical machine can be stopped. It can also be provided that the movement of the further machine is stopped if the further machine moves outside the window region into the transition region. If the information describing the position of the machine in relation to the transition region is available in the real process, the window trajectory can be determined by a parallel-running calculation. If the position information is incorrect or not up-to-date, the machine position of the further machine and the window position will not match and the non-separating protective devices trigger their protective function. This enables a safe operation of the machines.

In a further embodiment, the first non-separating protective devices and the second non-separating protective devices are designed in such a way that the first monitoring directions run perpendicular to the second monitoring directions. Here, the first non-separating protective devices can be arranged relative to one another in such a way that the first monitoring directions are parallel to one another. The second non-separating protective devices can also be arranged relative to one another in such a way that the second monitoring directions are parallel to one another. On the whole, two light curtains perpendicular to one another can thus be provided.

A protective apparatus according to one embodiment serves to adjust a protective function during operation of a machine. The protective apparatus includes a plurality of non-separating protective devices for monitoring a transition region. The transition region is arranged between a danger area in which a dangerous movement is performed with the machine and a surrounding area. The protective apparatus includes first non-separating protective devices to monitor the transition region along respective first monitoring directions and second non-separating protective devices for the independent monitoring of the transition region along respective second directions. At least one of the first non-separating protective devices and at least one of the second non-separating protective devices are arranged relative to one another in such a way that the first monitoring direction of the at least one first non-separating protective device and the second monitoring direction of the at least one second non-separating protective device have a point of intersection.

The protective apparatus can have a coordination unit (interface, controller, or processor) by which data can be received from the further machine. These data can describe the movement and/or position of the further machine. The position and/or the dimensions of the window region can then be determined by the coordination unit on the basis of these data. The non-separating protective devices can further be controlled or activated and/or deactivated by the coordination unit.

The preferred embodiments and their advantages presented with reference to the method apply accordingly to the protective apparatus.

Further features of the invention are set out in the claims, the figures and the description of the figures. The features and feature combinations mentioned above in the description and the features specified below in the description of the figures and/or shown in the figures alone are usable not only in the respectively indicated combination, but also in other combinations without departing the scope of the invention.

BRIEF DESCRIPTION OF THE DRAWINGS

The embodiments will now be explained in detail on the basis of preferred example embodiments and with reference to the attached drawings, in which.

DETAILED DESCRIPTION OF THE PREFERRED EMBODIMENTS

Identical or functionally identical elements are denoted with the same reference numbers in the figures.

Figure 1:
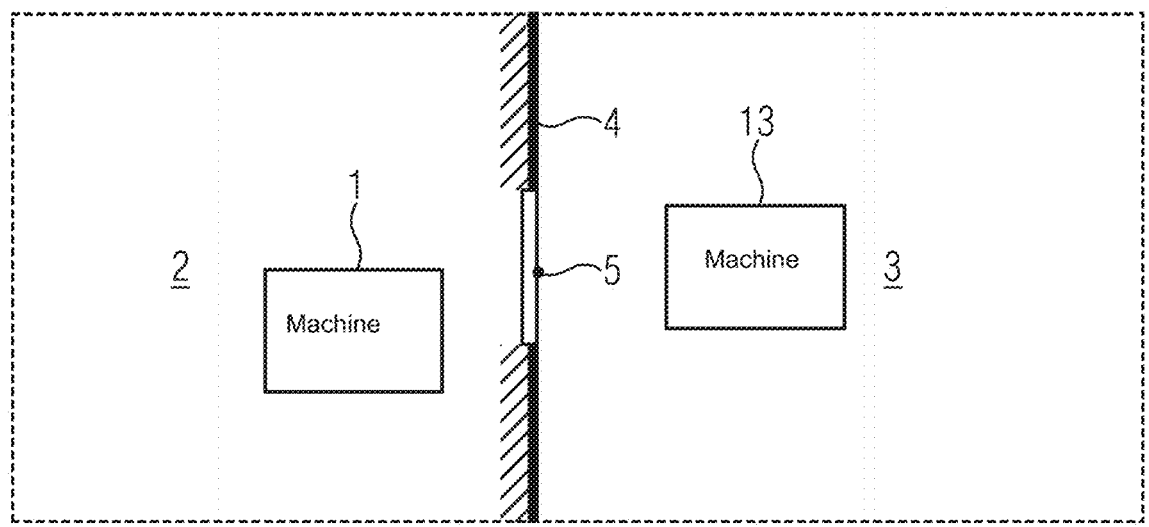
FIG. 1 shows a schematic view of embodiments of a machine, a further machine and a transition region between a danger area and a surrounding area.

FIG. 1 shows a schematic view of a safety-critical machine 1 and a further, non-safety-critical machine 13. The machine 1 or a part thereof moves during the operation of the machine 1. The safety or health of a person is at risk in a danger area 2 in the machine 1 and/or its surrounding area. The danger area 2 is separated from a surrounding area 3 by a separating protective device 4. The separating protective device 4 is a machine part which offers protection by a physical barrier. The separating protective device 4 can be provided by a grating or a door. A monitored transition region 5 between the surrounding area 3 and the danger area 2 is further present. As explained in detail below, this transition region is monitored by non-separating protective devices L1, L2. In the present example, the further, non-safety-critical machine 13 is located in the surrounding area 3. The further machine 13 can also be located in the danger area 2.

Figure 2:
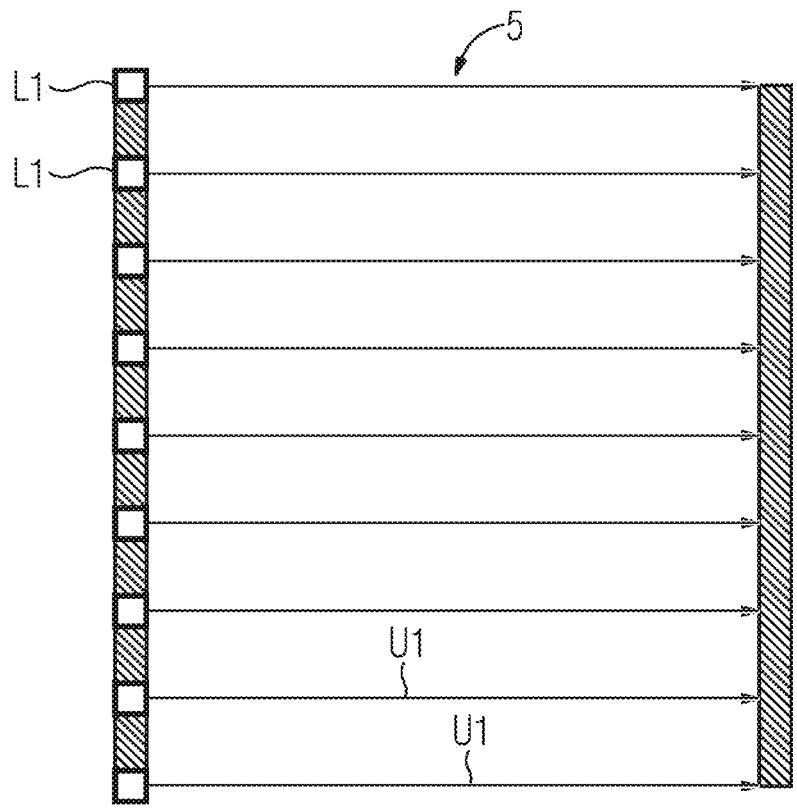
FIG. 2 shows an example plurality of first non-separating protective devices with which the transition region can be monitored.

FIG. 2 shows a plurality of first non-separating protective devices L1 with which the transition region 5 can be monitored. The first non-separating protective devices L1 can be designed as optical sensors in the form of a light barrier. Monitoring of the transition region 5 along a first monitoring direction U1 can be carried out with the respective first non-separating protective devices L1. In the present example, the first non-separating protective devices L1 are arranged equidistantly from one another. The first non-separating protective devices L1 are further arranged in such a way that the respective monitoring directions U1 are parallel to one another.

Figure 3:
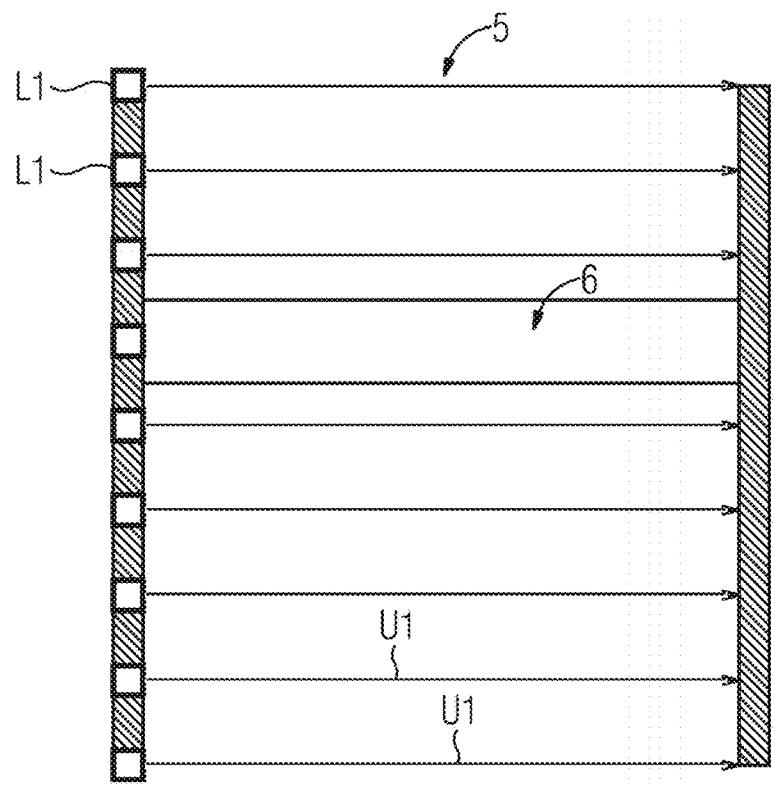
FIG. 3 shows the first non-separating protective devices according to FIG. 2, wherein one of the protective devices is deactivated to generate an unmonitored region.

FIG. 3 shows the plurality of first non-separating protective devices L1 according to FIG. 2, wherein one of the first non-separating protective devices L1 is deactivated. This creates an unmonitored region 6 in the transition region 5. This can also be referred to as region muting.

Figure 4:
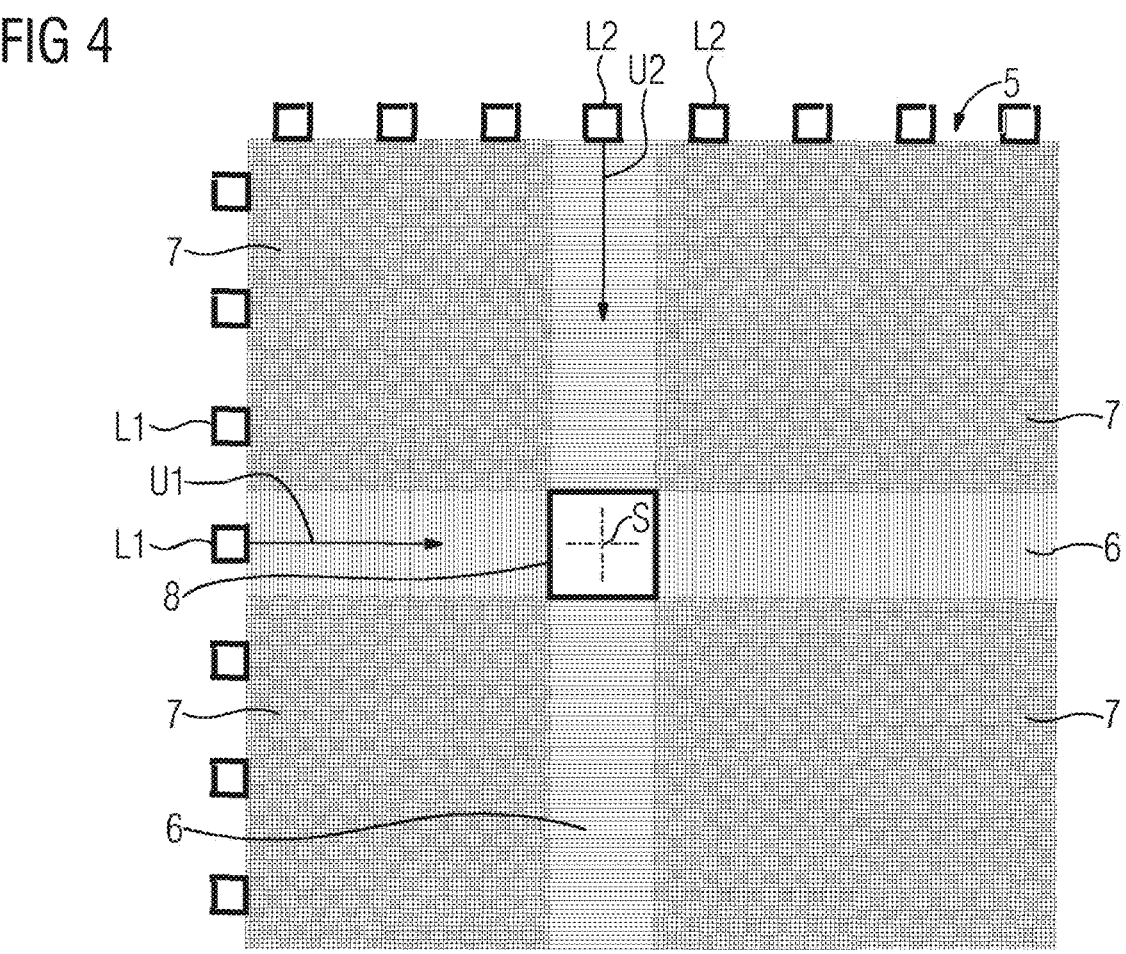
FIG. 4 shows example first non-separating protective devices and example second non-separating protective devices, wherein an unmonitored window region is generated by deactivating a first non-separating protective device and a second non-separating protective device.

FIG. 4 shows a plurality of first non-separating protective devices L1 and a plurality of second non-separating protective devices L2, wherein the transition region 5 is monitored with both the first non-separating protective devices L1 and the second non-separating protective devices L2. The first non-separating protective devices L1 are arranged relative to one another in such a way that the first monitoring directions U1 are all parallel to one another. The second non-separating protective devices L2 are also arranged relative to one another in such a way that the second monitoring directions U2 are all parallel to one another. The first non-separating protective devices L1 are further arranged relative to the second non-separating protective devices L2 in such a way that the first monitoring directions U1 in each case run perpendicular to the second monitoring directions U2. This creates subregions 7 with multiple monitoring in the monitoring region 5 which are monitored with both a first non-separating protective device L1 and a second non-separating protective device L2.

One of the first non-separating protective devices L1 is deactivated. This creates a region 6 with single monitoring along the first monitoring direction U1 in which the monitoring is performed only by the second non-separating protective devices L2. One of the second non-separating protective devices L2 is furthermore deactivated. This creates a region 6 with single monitoring along the second monitoring direction U2 in which the monitoring is performed only by the first non-separating protective devices L1. An unmonitored window region 8 is created in the region of a point of intersection S of the first monitoring direction U1 of the deactivated first non-separating protective device L1 and the second monitoring direction U2 of the deactivated second non-separating protective device L2. Neither a monitoring by a first non-separating protective device L1 nor a monitoring by a second non-separating protective device L2 is therefore performed in the window region 8.

The example from FIG. 4 shows a two-dimensional transition region 5 which is monitored by two orthogonally arranged light curtains. One light curtain is formed by the first non-separating protective devices L1 and the other light curtain is formed by the second non-separating protective devices L2. In this case, the window region 8 assumes the shape of a rectangle (and is flat). The size of the window region 8 is defined by the overlap of the ranges 6 which in each case have single monitoring. The position and dimensions of the window region 8 can be adjusted by the control of the non-separating protective device L1, L2.

Figure 5:
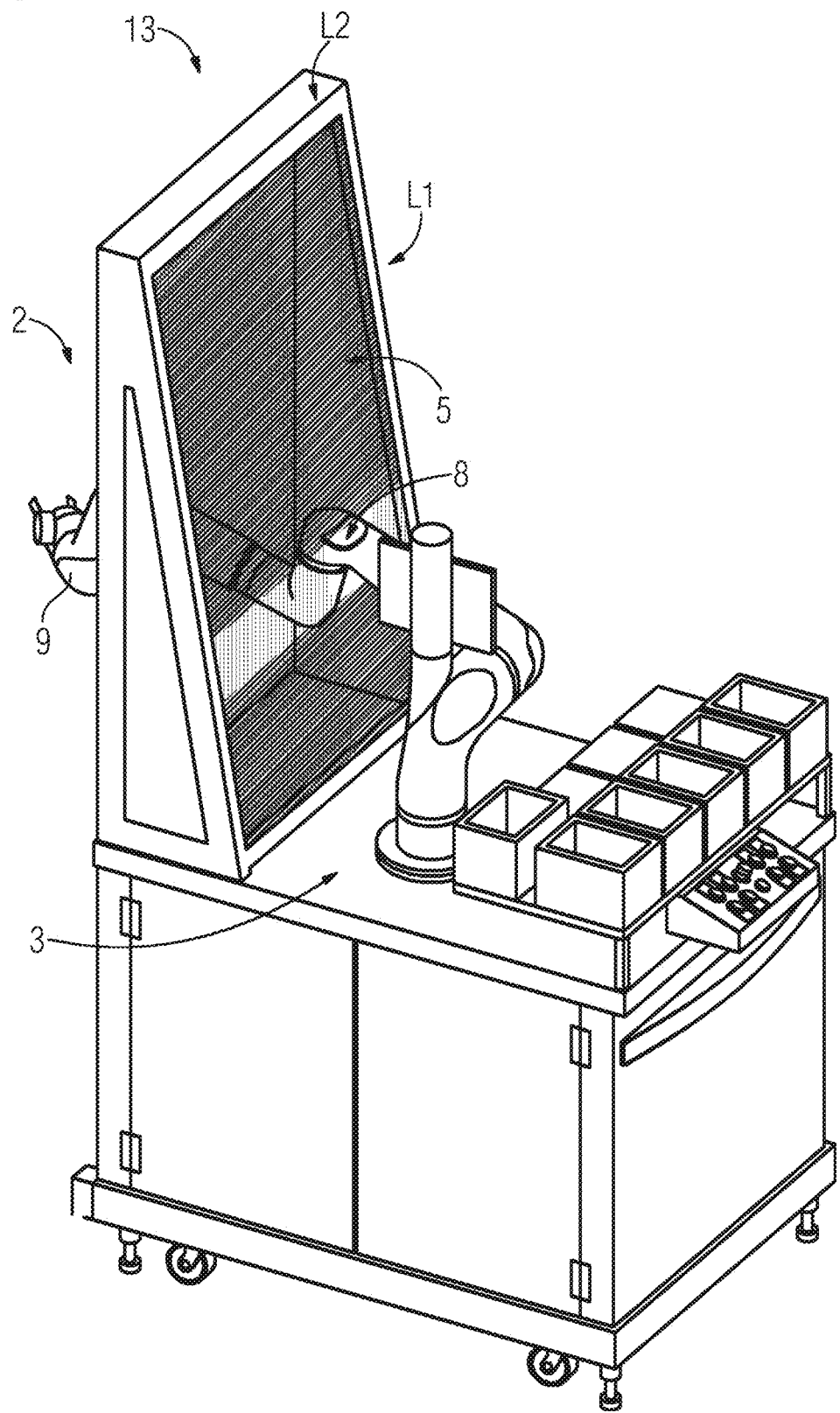
FIG. 5 shows one embodiment of a non-safety-critical machine having a robot arm which is moved through the unmonitored window region.

FIG. 5 shows a further, non-safety-critical machine 1 which has a robot arm 9 as a moving part. Here also, a light curtain is defined by first non-separating protective devices L1 and second non-separating protective devices L2. The unmonitored window region 8 is furthermore generated. In this case, the position and/or the dimensions of the window region 8 are adjusted according to the movement of the further machine 13 or of the robot arm 9. The movement of the robot arm 9 through the transition region 5 can be enabled in this way without one of the non-separating protective devices L1, L2 being triggered and therefore the movement of the machine 1 being stopped.

Figure 6:
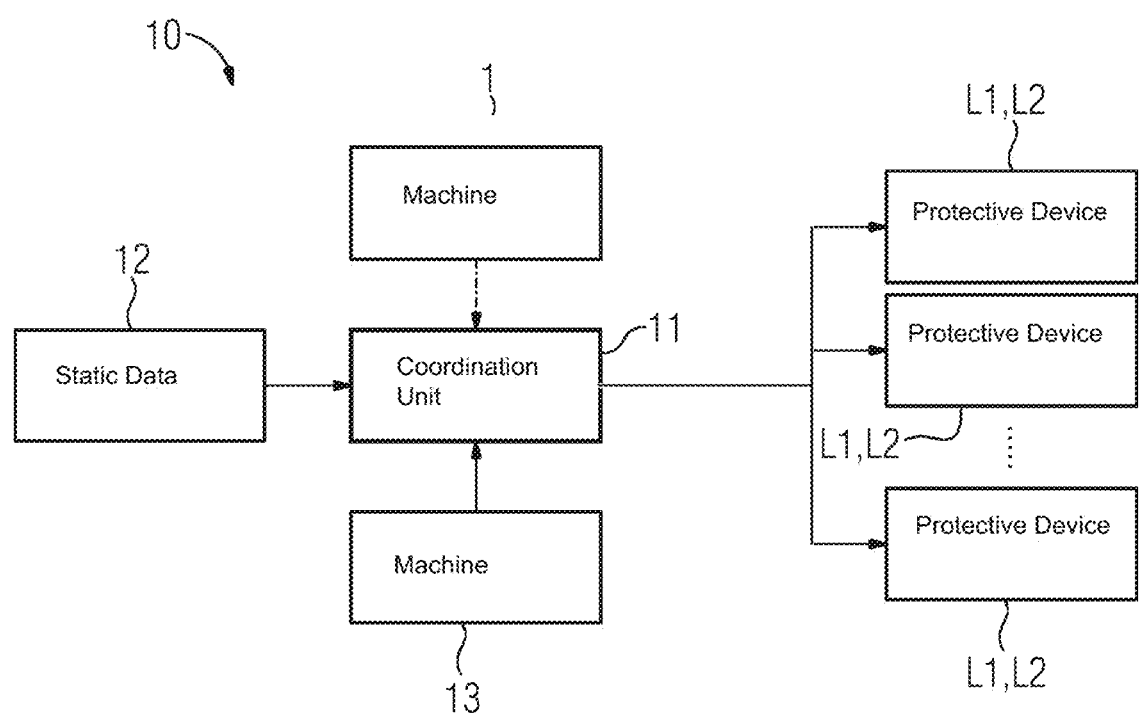
FIG. 6 shows a schematic view of one embodiment of a protective apparatus for providing a protective function during the operation of the machine.

FIG. 6 shows a schematic view of a protective apparatus 10 for providing the protective function during the operation of the machine 1. The protective apparatus 10 includes a coordination unit 11 (controller, interface, processor). The coordination unit 11 receives data from the further machine 13 which is a non-safety-critical machine. These data describe the position and/or the movement of the further machine 13. Data can describe, for example, a trajectory for the movement of the further machine 13. These data can also be transformed, if necessary, in relation to the coordinate system of the transition region 5 by the coordination unit 11. The further machine 13 can also alternatively transfer a chosen trajectory to the coordination unit 11 according to the operation to be performed. The coordination unit 11 can further receive static data 12. For a chosen (machine) trajectory, the associated window trajectory which describes the position of the window region 8 is located in the static data. A time-synchronous evaluation and/or execution can thereby be enabled and the position and/or the dimensions of the window region 8 can be adjusted according to the movement of the further machine 13. The coordination unit 11 can further receive data of the machine 1 which is a safety-critical machine in the danger area 2. The movement of the machine 1 can thus be taken into account. The position of the safety-critical machine 1 can thereby also be used to avoid collisions. On the basis of the received data, the coordination unit 11 calculates the regions 6 of the non-separating protective devices L1, L2 in which the region muting is to be activated.

The invention claimed is:

1. A method for adjusting a protective function during operation of the machine, the method comprising:
    monitoring a transition region by first and second non-separating protective devices, wherein the transition region is arranged between a danger area in which a dangerous movement is carried out with the machine and a surrounding area, wherein the transition region is monitored with the first non-separating protective devices along respective first monitoring directions and, independently therefrom, with the second non-separating protective devices along respective second monitoring directions, a plurality of the first non-separating protective devices and a plurality of the second non-separating protective devices are arranged relative to one another in such a way that the first monitoring directions of the first non-separating protective devices and the second monitoring directions of the second non-separating protective devices have respective points of intersection, and
    adjusting a position and/or dimensions of an unmonitored window region assigned to the points of intersection through a deactivation and/or activation of the respective first non-separating protective devices and the respective second non-separating protective devices.

2. The method as claimed in claim 1, characterized in that the at least one first non-separating protective device and at least one second non-separating protective device are deactivated to generate a window region assigned to the point of intersection.

3. The method as claimed in claim 1, characterized in that a movement of a further, non-safety-critical machine is determined and the position and/or the dimensions of the unmonitored window region is/are adjusted continuously depending on the movement.

4. The method as claimed in claim 3, characterized in that the position and/or the dimensions of the unmonitored window region are determined in such a way that an operation or movement of the further non-safety-critical machine through the transition region is enabled.

5. The method as claimed in claim 4, characterized in that, in order to determine the movement of the further non-safety-critical machine, a trajectory is calculated and/or movement data which describe the movement of the further non-safety-critical machine are provided by the further non-safety-critical machine.

6. The method as claimed in claim 5, characterized in that, in order to determine the movement of the further non-safety-critical machine, the movement of the further non-safety-critical machine is observed during an initial learning phase by the first non-separating protective device and/or the second non-separating protective device.

7. The method as claimed in claim 3, characterized in that, in order to determine the movement of the further non-safety-critical machine, a trajectory is calculated and/or movement data which describe the movement of the further non-safety-critical machine are provided by the further non-safety-critical machine.

8. The method as claimed in claim 3, characterized in that, in order to determine the movement of the further non-safety-critical machine, the movement of the further non-safety-critical machine is observed during an initial learning phase by the first non-separating protective device and/or the second non-separating protective device.

9. The method as claimed in claim 3, characterized in that the movement of the machine is interrupted if a part of the machine or a different object is detected in the transition region by the first non-separating protective device and/or the second non-separating protective device.

10. The method as claimed in claim 3, characterized in that the first non-separating protective devices and the second non-separating protective devices are designed in such a way that the first monitoring directions run perpendicular to the second monitoring directions.

11. The method as claimed in claim 1, characterized in that the movement of the machine is interrupted if a part of the machine or a different object is detected in the transition region by the first non-separating protective device and/or the second non-separating protective device.

12. The method as claimed in claim 1, characterized in that the first non-separating protective devices and the second non-separating protective devices are designed in such a way that the first monitoring directions run perpendicular to the second monitoring directions.

13. A protective apparatus for adjusting a protective function during operation of a machine, the protective apparatus comprising:
    a plurality of non-separating protective devices for monitoring a transition region, wherein the transition region is arranged between a danger area in which a dangerous movement is performed with the machine and a surrounding area, wherein first non-separating protective devices of the plurality of non-separating protective devices are arranged to monitor the transition region along respective first monitoring directions and second non-separating protective devices of the plurality of non-separating protective devices are arranged for the independent monitoring of the transition region along respective second directions, wherein at least one of the first non-separating protective devices and at least one of the second non-separating protective devices are arranged relative to one another in such a way that the first monitoring direction of the at least one first non-separating protective device and the second monitoring direction of the at least one second non-separating protective device have a point of intersection, wherein a plurality of the first non-separating protective devices and a plurality of the second non-separating protective devices are arranged in relation to one another in such a way that the first monitoring directions of the first non-separating protective devices and the second monitoring directions of the second non-separating protective devices have respective points of intersection, wherein a position and/or dimensions of an unmonitored window region assigned to the points of intersection is/are established by a deactivation and/or activation of the respective first non-separating protective devices and the respective second non-separating protective devices.

* * * * *